(12) United States Patent
Sugimoto (10) Patent No.: US 6,672,213 B2
(45) Date of Patent: Jan. 6, 2004

(54) PRINTING PROGRAM AND PRINTING SYSTEM

(75) Inventor: Tetsuya Sugimoto, Muko (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/351,530

(22) Filed: Jan. 27, 2003

(65) Prior Publication Data

US 2003/0140810 A1 Jul. 31, 2003

(30) Foreign Application Priority Data

Jan. 31, 2002 (JP) ........................................ 2002-023499

(51) Int. Cl.[7] .............................. B41F 1/54; G06F 13/00
(52) U.S. Cl. ..................... 101/484; 358/1.15; 358/1.13; 358/1.14; 358/1.16; 358/1.18
(58) Field of Search ...................... 101/484; 358/1.15, 358/1.18, 1.14, 1.13, 1.16, 1.2, 1.11; 400/76, 70; 707/104.1; 709/203, 246; 715/530, 542

(56) References Cited

U.S. PATENT DOCUMENTS

| 5,146,575 | A | * | 9/1992 | Nolan, Jr. .................... 711/164 |
| 5,845,078 | A | * | 12/1998 | Tezuka et al. ............... 709/222 |
| 6,188,807 | B1 | * | 2/2001 | Arakawa ...................... 382/319 |
| 6,219,151 | B1 | * | 4/2001 | Manglapus et al. ......... 358/1.15 |
| 6,268,924 | B1 | * | 7/2001 | Koppolu et al. ............ 358/1.13 |
| 6,310,692 | B1 | * | 10/2001 | Fan et al. ................... 358/1.14 |
| 6,373,585 | B1 | * | 4/2002 | Mastie et al. ............... 358/1.15 |
| 6,426,799 | B1 | * | 7/2002 | Okimoto et al. ........... 358/1.15 |
| 6,427,032 | B1 | * | 7/2002 | Irons et al. ................. 382/306 |
| 6,449,055 | B1 | * | 9/2002 | Okimoto et al. ........... 358/1.15 |
| 2002/0109870 | A1 | * | 8/2002 | Moore et al. ................ 358/504 |
| 2002/0113979 | A1 | * | 8/2002 | Rahgozar et al. ............ 358/1.6 |
| 2003/0133145 | A1 | * | 7/2003 | Koppich et al. ........... 358/1.15 |
| 2003/0137688 | A1 | * | 7/2003 | Lawrence et al. ......... 358/1.15 |

FOREIGN PATENT DOCUMENTS

JP     2000-147955    5/2000

* cited by examiner

Primary Examiner—Charles H. Nolan, Jr.
Assistant Examiner—Wasseem H. Hamdan
(74) Attorney, Agent, or Firm—Burns, Doane, Swecker & Mathis, LLP (57) ABSTRACT

In a printing system including a client, a print server and a printer that are connected to a network, the print server has a database associating printing parameter information with each printed material output apparatus user (i.e., recipient), as well as a data processing unit. When print data is sent from the client to the printer, the printing parameters for the output apparatus user specified by the sender are obtained from the database, and the print data is processed by the data processing unit based on these printing parameters. The processed print data is then output by the printer. As a result, printing can be performed using the printing parameters desired by the recipient.

11 Claims, 11 Drawing Sheets

| USER Identifier | Printing Parameters |
|---|---|
| User A | 1up, both sides |
| User B | 2up, both sides, staple ON |
| User C | 1up, single side, toner save ON |
| ... | ... |

| USER Identifier | Printing Parameters |
|---|---|
| User A (formal document) | no processing |
| User A (draft document) | 2up, both sides |
| User B | 1up, single side, toner save ON |
| ... | ... |

FIG. 10

| USER Identifier | Additional Information (Quality) | Printing Parameters |
|---|---|---|
| User A | formal document | no processing |
| | draft document | 2up, both sides |
| User B | formal document | no processing |
| | draft document | no processing |
| ... | | ... |

FIG. 11

PRINTING PROGRAM AND PRINTING SYSTEM

The present application claims priority to Japanese Application No. 2002-23499 filed Jan. 31, 2002, the entire content of which is hereby incorporated by reference.

BACKGROUND OF THE INVENTION

1. Field of the Invention

The present invention relates to a printing technology that uses a transmission apparatus that transmits print data and an output apparatus that outputs printed materials.

2. Description of the Related Art

In a printing system of the conventional art, a printed material comprising a printed document, for example, can be delivered to a specific user (i.e., a recipient) through transmission of print data by specifying the mail bin of the printer used by the user.

However, because the parameters for the printing of the document to be delivered to the recipient are set by the sender of the print data, the problem arises that the printed material is not always printed using the printing parameters desired by the recipient.

SUMMARY OF THE INVENTION

A main object of the present invention is to provide a printing technology that allows print data sent from the sender to be printed using the printing parameters desired by the recipient.

In order to attain these and other objects, according to one aspect of the present invention, the print server that generates printing output data by processing printing base data received from the client over a network and sends the generated printing output data to the printer over the network includes a storage unit that stores a database in which printed material recipient and document type information are associated with printing parameter information; first obtaining means that obtains from the client information regarding the specified recipient; second obtaining means that obtains from the client information regarding the specified document type; extraction means that extracts from the database the printing parameter information associated with the recipient information obtained by the first obtaining means and the document type information obtained by the second obtaining means; and a processing means that processes the printing base data and generates printing output data based on the printing parameter information extracted by the extraction means.

The invention itself, together with further objects and attendant advantages, will best be understood by reference to the following detailed description taken in conjunction with the accompanying drawings.

BRIEF DESCRIPTION OF THE DRAWINGS

In the following description, Ice parts are designated by like reference numbers throughout the several drawings.

DETAILED DESCRIPTION OF THE PREFERRED EMBODIMENTS

Important Components of Printing System

Figure 1:
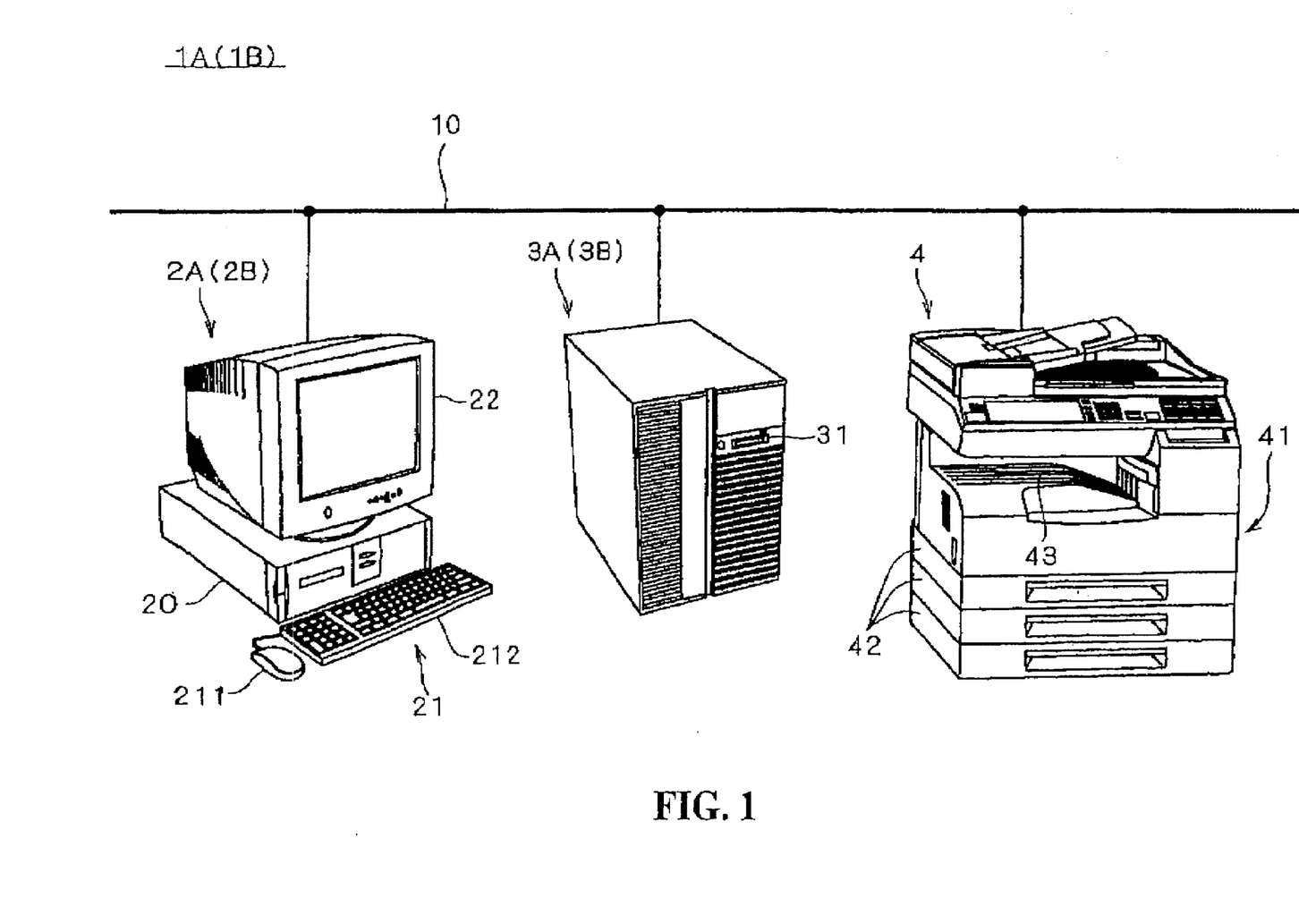
FIG. 1 is a drawing showing the important components of a printing system 1A pertaining to the present invention.

FIG. 1 shows the important components of a printing system 1A.

The printing system 1A has a client computer (hereinafter referred to as simply a 'client') 2A that is data-communicably connected to a network 10, a print server 3A and a printer 4, comprising a system in which information processing apparatuses including these apparatuses are interconnected in a manner that enables mutual data transmission. While one client 2A, one print server 3A and one printer 4 are shown in FIG. 1, a larger number of apparatuses of each type are generally connected to the network 10.

The client 2A comprises a personal computer, for example, and functions as a transmission apparatus that sends print data. The client 2A has a processing unit 20 having a box configuration, an operation unit 21 and a display unit 22 comprising such device as a CRT.

The operation unit 21 has a mouse 211 and a keyboard 212, and receives input operations performed by the user (i.e., the sender) with regard to the client terminal 2A.

The print server 3A functions as a computer to manage the printer 4, and includes a drive 31 disposed in the front side thereof into which an optical disk 91 is inserted.

The printer 4 comprises a multi function peripheral (hereinafter abbreviated as 'MFP'), for example. This printer 4 is a multi-functional apparatus that has the functions of a scanner, copying machine, facsimile machine, etc., and can send and receive data to and from the client 2A and the print server 3A over the network 10.

The printer 4 functions as an output apparatus, and includes a printing unit 41 that performs printing onto a recording sheet based on print data, a paper supply unit 42 that supplies recording sheets to the printing unit 41, and a tray 43 that is disposed in the center of the printer 4 and onto which the recording sheet on which printing has been performed by the printing unit 41 (i.e., the printed material) is ejected.

Figure 2:
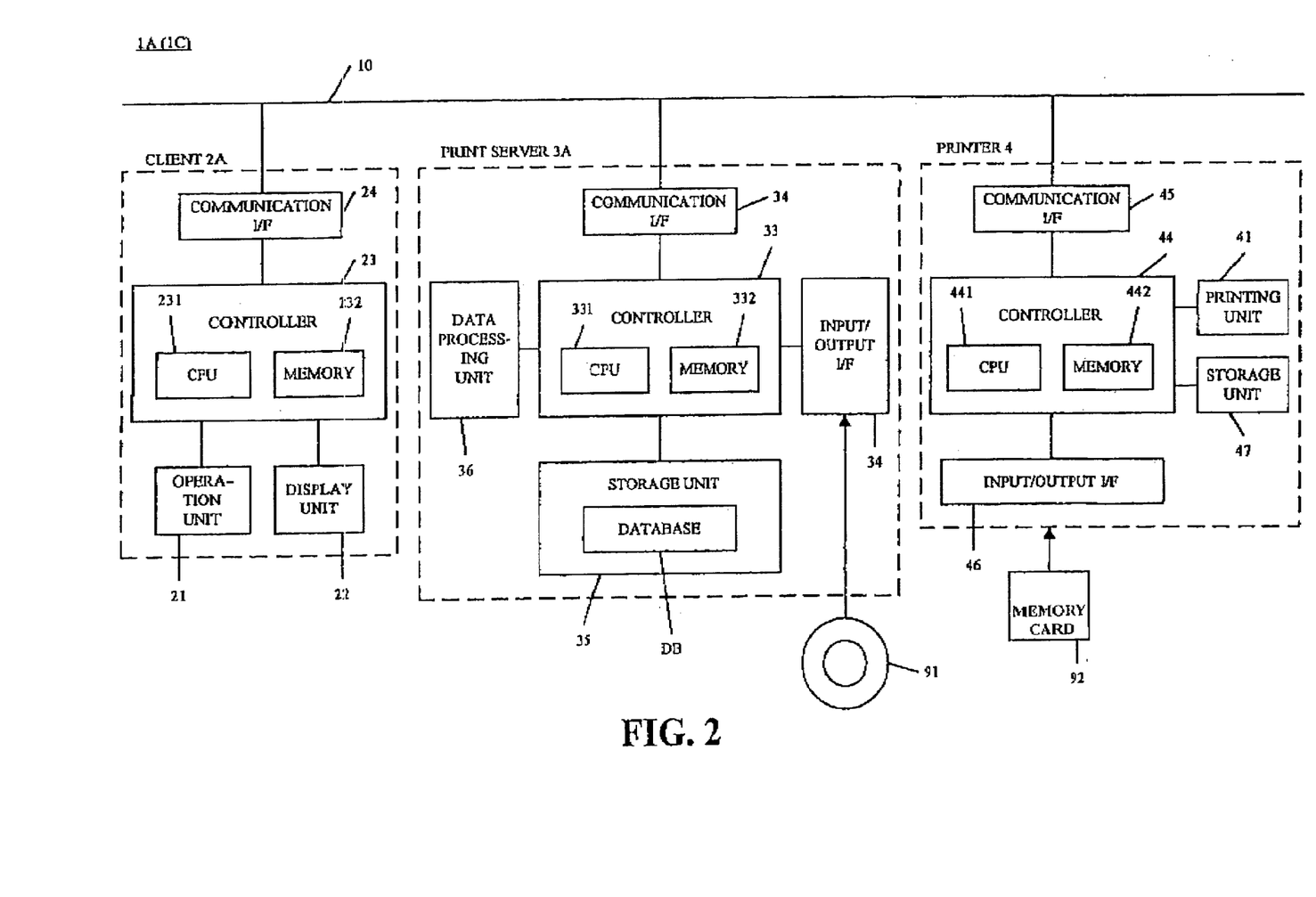
FIG. 2 is a drawing showing the function blocks of the printing system 1A.

FIG. 2 is a drawing showing the function blocks of the printing system 1A.

The processing unit 20 of the client 2A includes a controller 23 that is electrically connected to the operation unit 21 and the display unit 22 described above. The processing unit 20 includes a communication I/F 24 that is electrically connected to the controller 23.

The communication I/F 24 is an interface for data transmission to and from the print server 3A and the printer 4 over the network 10.

The controller 23 has a CPU 231 and a memory 232 that operate as a computer, and performs overall control of the operations of the client 2A.

The print server 3A include a communication I/F 32 by which to connect to the network 10, and a controller 33 that is electrically connected to the communication I/F 32. The print server 3A also includes an input/output I/F 34, a storage unit 35 and a data processing unit 36 that are electrically connected to the controller 33.

The communication I/F 32 is an interface for data transmission to and from the client 2A and the printer 4 over the network 10.

The input/output I/F 34 is an interface for the data input and output to and from the optical disk 91 via the drive 31, which is a recording medium.

The storage unit 35 comprises a hard disk, for example, that stores a printing program (described below) and has the database DB explained below.

Figure 3:
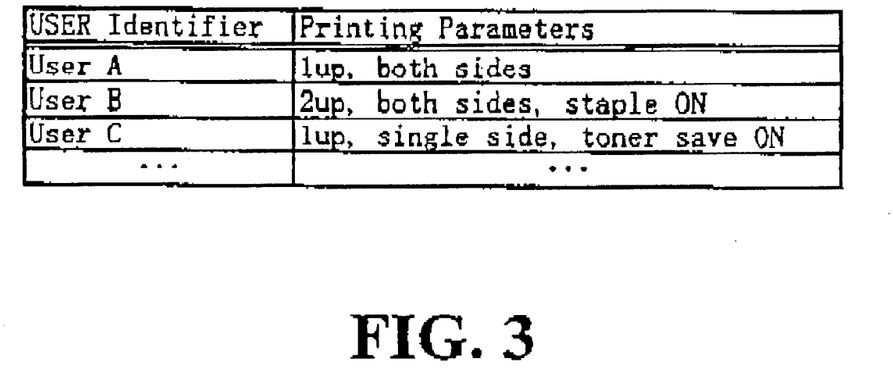
FIG. 3 is a drawing showing one example of the data stored in a database DB.

The database DB is a database in which, as shown in FIG. 3, the printing parameter information such as '1 up, both sides' and '2 up, both sides, staple ON', for example, is associated with the users of output apparatuses, such as 'user A' and 'user B'. The printing parameter information in this database DB is information that is input in advance by the users of the output apparatuses.

The data processing unit 36 processes the print data sent from the client 2A based on the printing parameter information taken from the database DB. Printing of the print data by the printer 4 is enabled when the processed print data is sent to the printer 4 via the communication I/F 32.

The controller 33 has a CPU 331 and a memory 332 that operate as a computer, performs overall control of the operations of the print server 3A. Printing by the printer 4 using the printing parameters desired by the output apparatus user is enabled via the execution of the printing program by the controller 33, as described below.

Program data such as the printing program recorded on the optical disk 91 can be stored in the memory 332 of the controller 33 via the input/output I/F 34. Through such storage, the stored program can be reflected in the operations of the print server 3A.

The printer 4 includes a controller 44 that is electrically connected to the printing unit 41. The printer 4 also includes a communication I/F 45, an input/output I/F 46 and a storage unit 47 that are electrically connected to the controller 44.

The communication I/F 45 is an interface for data transmission to and from the client 2A and the print server 3A over the network 10.

The input/output I/F 46 is an interface for the input/output of data to and from the memory card 92 that operates as a recording medium, and includes a card slot (not shown) disposed on the side of the printer 4.

The storage unit 47 stores processed print data received from the print server 3A as well as other data.

The controller 44 has a CPU 331 and a memory 332 that operate as a computer, and performs overall control of the operations of the printer 4.

Program data recorded on the memory card 92 can be stored in the memory 442 of the controller 44 via the input/output I/F 46. Through such storage, the stored program can be reflected in the operations of the printer 4.

Operation of Printing System 1A

The operation of the printing system 1A having the construction described above will now be explained below The operation of the print server 3A will be explained using a specific example in which print data is sent from the client 2A by a sender to deliver a printed material to the user B (i.e., the recipient) in FIG. 3 that uses the printer 4.

Figure 4:
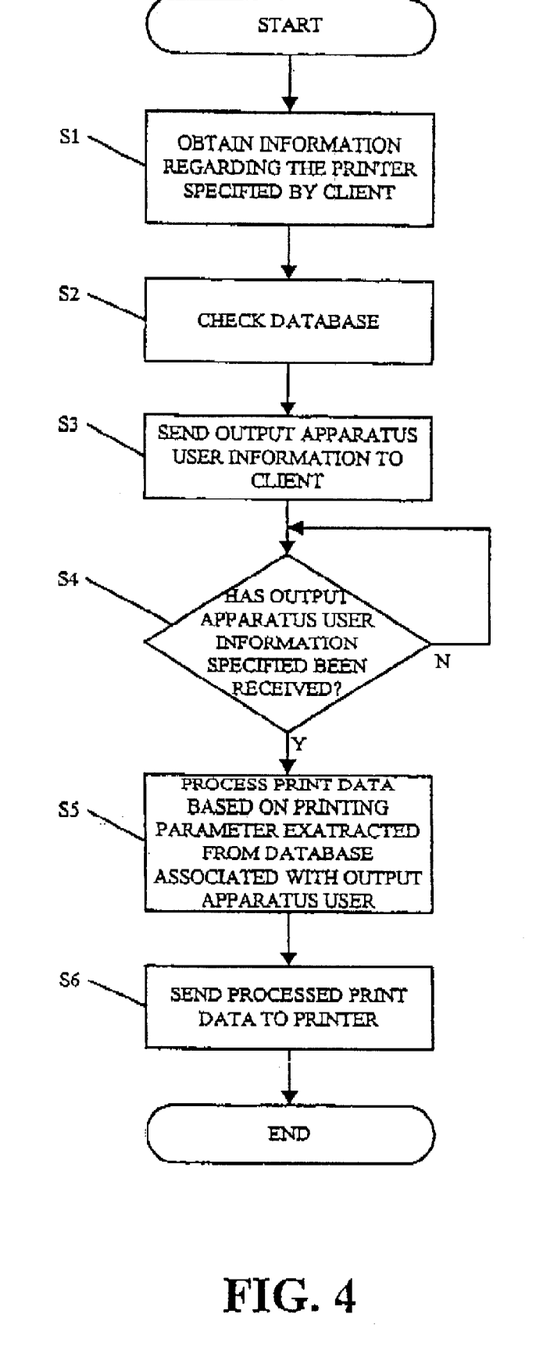
FIG. 4 is a flow chart of the basic operations of a print server 3A.

FIG. 4 is a flow chart of the basic operations of the print server 3A. These operations are carried out when the printing program stored in the storage unit 35 is executed by the controller 33.

In step S1, information regarding the printer 4 that was specified by the sender via the client 2A as the apparatus to receive the print data is obtained over the network 10.

In step S2, the database DB in the storage unit 35 is checked.

In step S3, the output apparatus user information is sent to the client 2A based on the database DB checked in step S2. Consequently, the client 2A can display a list of output apparatus users (user A, user B, user C, . . . ) received from print server 3A on the display unit 22. The sender then specifies as the specified recipient the user B to whom the sender wants to deliver the printed material from the list of the output apparatus users.

It is determined in step S4 whether or not the information regarding the output apparatus user B specified by tie sender has been received. It such information has been received, the controller 33 moves to step S5, while if the information has not been received, the controller 33 repeats step 34. It is acceptable if, in the event information regarding the output apparatus user B is not available, the following steps S5 and S6 are not performed, i.e., printing is performed without processing of the print data.

In step S5, the printing parameters (see FIG. 3) associated with the output apparatus user B, who is the specified recipient, is extracted from the database DB as the printing parameters of the specified recipient, and the print data sent from the client 2A is processed by the data processing unit 36 based on these printing parameters. In this case, the controller 33 sends the data processing unit 36 a command to perform an operation to process the print data (printing base data) based on the printing parameter information associated with the output apparatus user B, and to generate processed print data (printing output data)

In step S6, the print data processed in step S5 is sent w the printer 4 over the network 10. Consequently, the print data can be output by the printer 4 using the printing parameters desired by the output apparatus user B, i.e., '2up, both sides, staple ON'.

Because the print data can be processed and output by the printer using the printing parameters associated wit the output apparatus user (i.e., the recipient) via the operations of the printing system 1A described above, printing can be performed using the printing parameters desired by the recipient.

Figure 5:
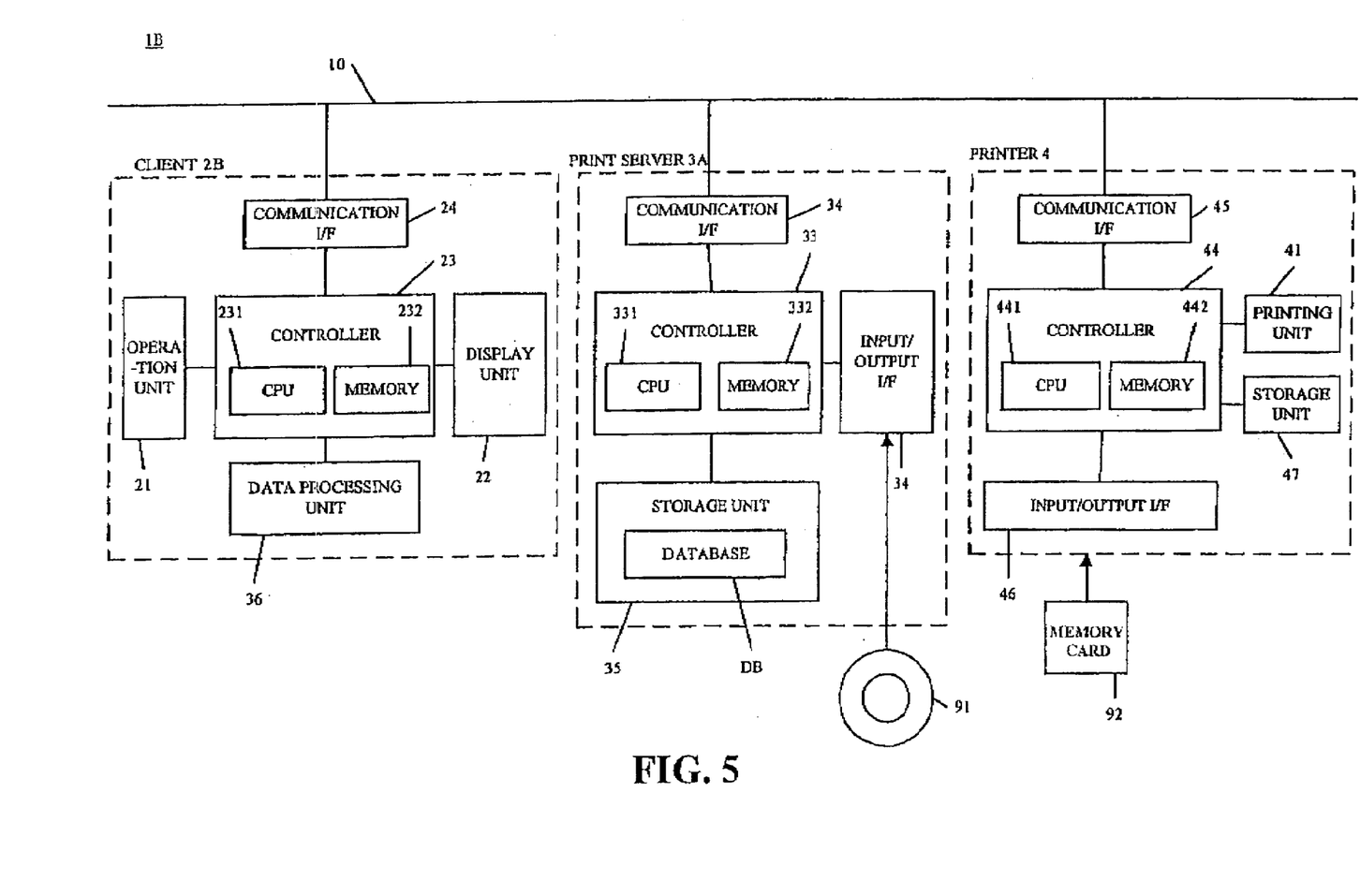
FIG. 5 is a drawing showing the function blocks of a printing system 1B.

While the printing system 1A described above has a construction in which the data processing unit 36 is included in the print server 3A, a printing system 1B having a construction in which the data processing unit 36 is included in the client, as shown in FIG. 5, is also acceptable.

Although the operations of the print server 3B of this printing system 1B are similar to the operations of the print server 3A described above, the former differs from the latter in that the operations of steps 35 and 36 in the flow chart shown in FIG. 4 are executed not by the print server 3B but by the client 2B.

Printing can be performed in the printing system 1B using the printing parameters desired by the recipient in the same way as with the printing system 1A.

Figure 6:
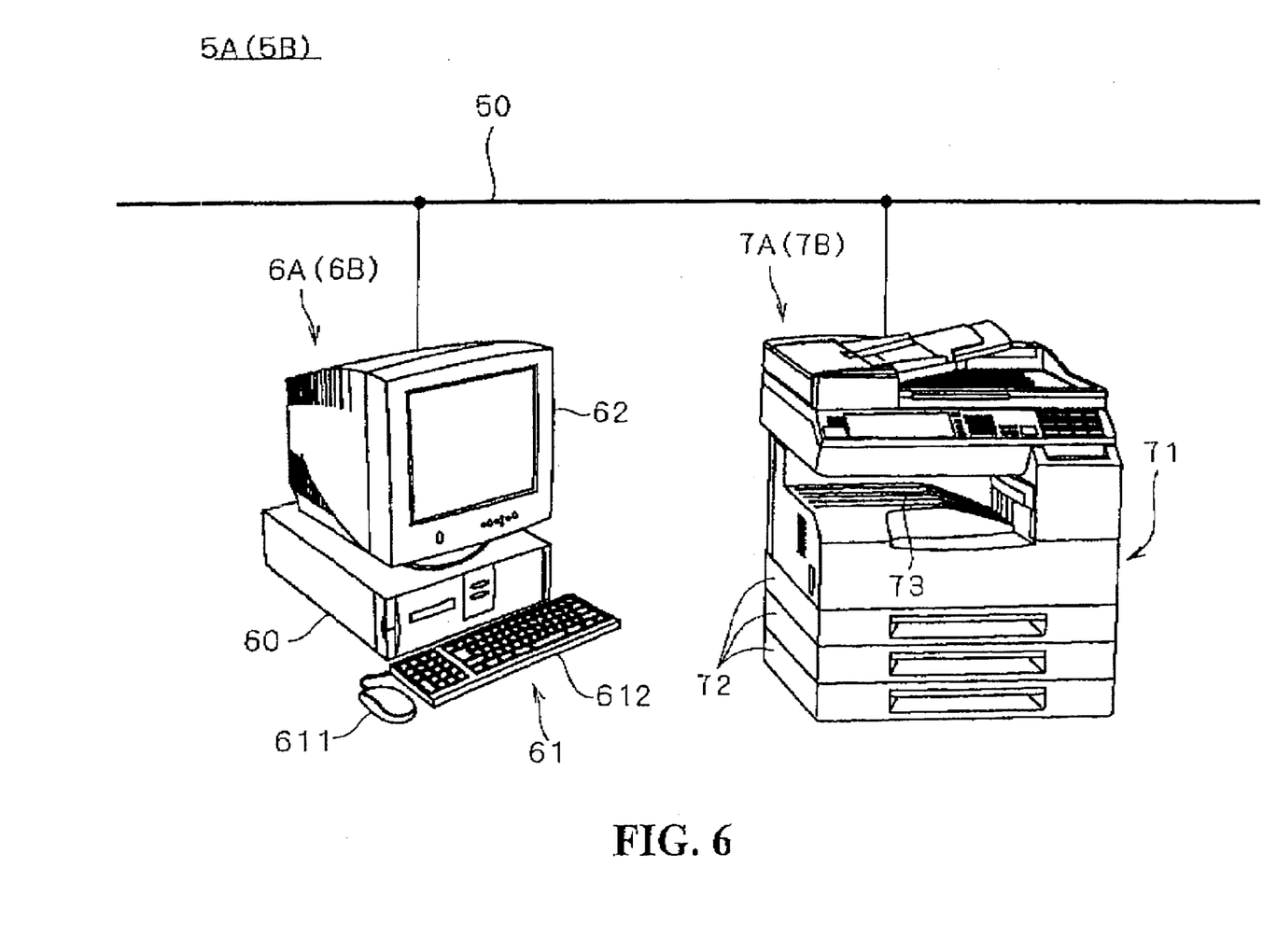
FIG. 6 is a drawing showing the important components of a printing system 5A pertaining to the present invention.

FIG. 6 is a drawing showing the important components of a printing system 5A that is different from the printing system 1A.

The printing system 5A has the same construction as the printing system 1A except that the print server 3A is eliminated, and has a client 6A and a printer 7A that are data-communicably connected to a network 50. Only one client 6A and one printer 7A are shown in FIG. 6, but a larger number of apparatuses of each type are generally connected to the network 50.

The client 6A has, as in the Case of the client 2A, a processing unit 60, an operation unit 61 and a display uni 62.

The printer 7A comprises, as in the case of the printer 4, an MFP, for example. The printer 7A is a multi-functional apparatus having the functions of a scanner, copying machine, facsimile machine, etc., and can send and receive data to and from the client 6A over the network 50.

Figure 7:
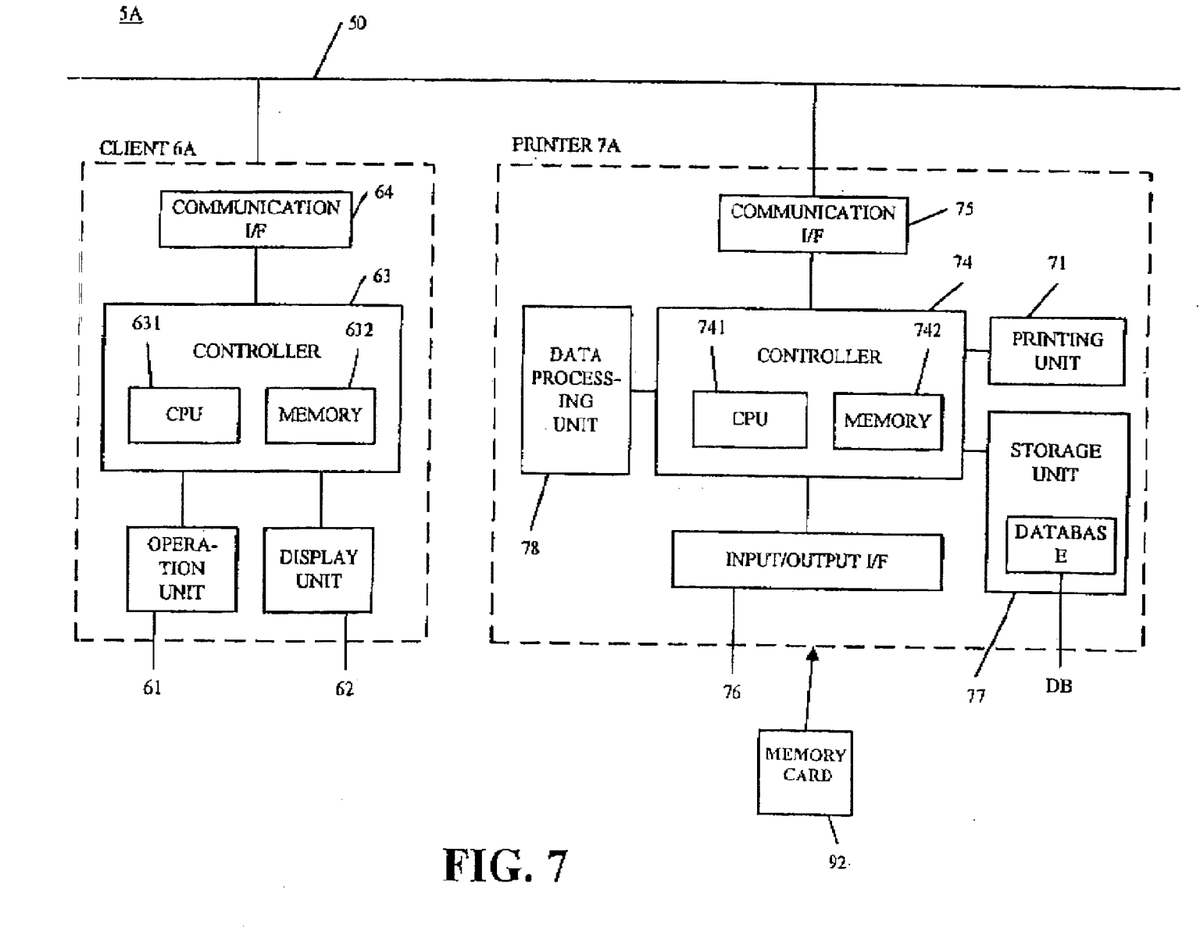
FIG. 7 is a drawing showing the function blocks of the printing system 5A.

FIG. 7 is a drawing showing the function blocks of the printing system 5A.

The processing unit 60 of the client 6A bas the same construction as the embodiment described above, and includes an operation unit 61, a display unit 62, a controller 63 and a communication I/F 64.

The printer 7A, like the printer 4A, has a printing unit 71, a controller 74, a communication I/F 75, an input/output I/F 76 and a storage unit 77, but differs from the printer 4A in that it also includes a data processing unit 78.

The storage unit 77, like the storage unit 35 of the print server 3A, stores a database DB comprising printing parameters information for multiple output apparatus users shown in FIG. 3, as well as a printing program (described below).

The data processing unit 78, like the data processing unit 36 of the print server 3A, processes print data received from the client 6A based on the database DB.

The controller 74 has a CPU 741 and a memory 742 that operate as a computer, and performs overall control of the operations of the printer 7A. When the printing program is executed by the controller 74, printing can be performed by the printer 7A using the printing parameters desired by the output apparatus user, as described below.

Program data such as the printing program stored on the memory card 92 can be stored in the memory 742 of the controller 74 via the input/output I/F 76.

Consequently, the program stored therein can be reflected in the operations of the printer 7A.

Operations of Printing System 5A

The operations of the printing system 5A having the construction described above will now be explained. The operations of the printer 7A will be explained here using a specific example in which print data is sent by a sender from the client 6A to deliver a printed material to the user B (i.e., the recipient) in FIG. 3 who uses the printer 7A.

Figure 8:
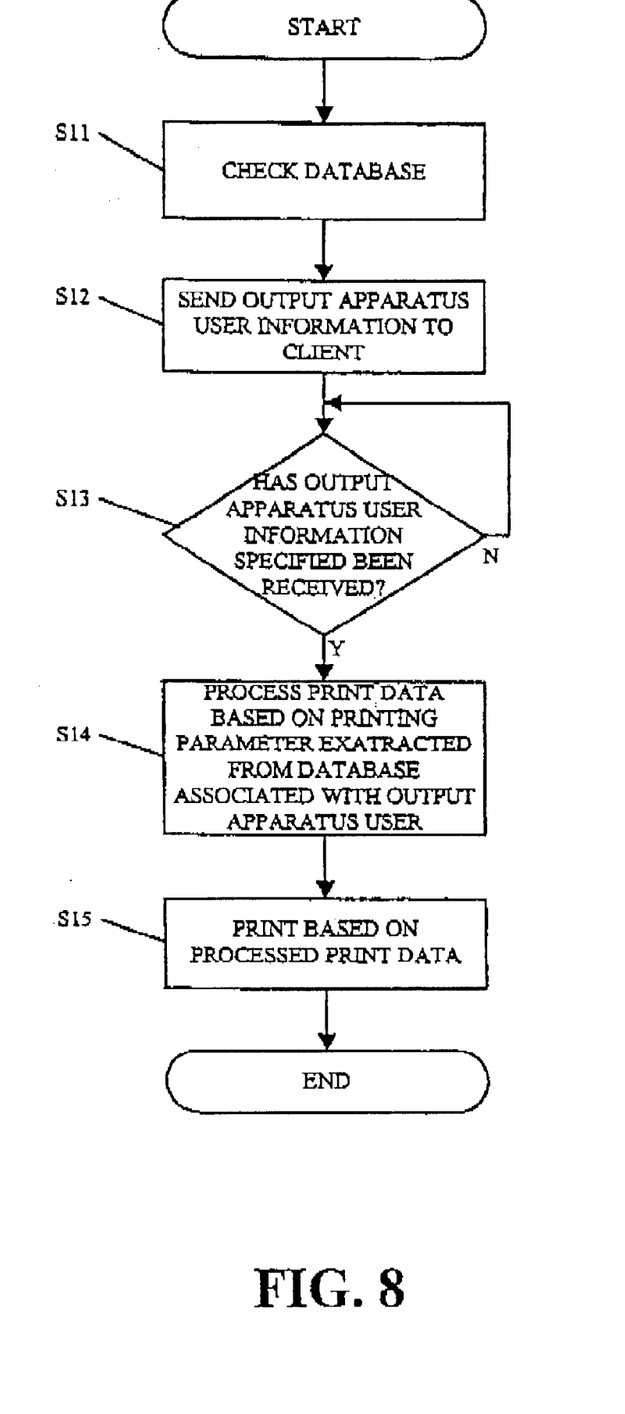
FIG. 8 is a flow chart showing the basic operations of a printer 7A.

FIG. 8 is a flow chart of the basic operations of the printer 7A. These operations are performed when the printing program stored in the storage unit 77 is executed by be controller 74.

The same operations as those performed in steps S2 through S5 of the flow chart shown in FIG. 4 are performed in steps S11 through S14.

In step S15, the printing unit 71 is driven and printing is performed based on the processed data obtained via processing in step S14. Consequently, the print data can be output by the printer 7A using the printing parameters desired by the output apparatus user B, i.e., '2up, both sides, staple ON'.

Because the print data can be processed and output by the printer using the printing parameters associated with the output apparatus user (i.e., the recipient) via the operations of the printing system 5A described above, printing can be performed using the printing parameters desired by the recipient.

Figure 9:
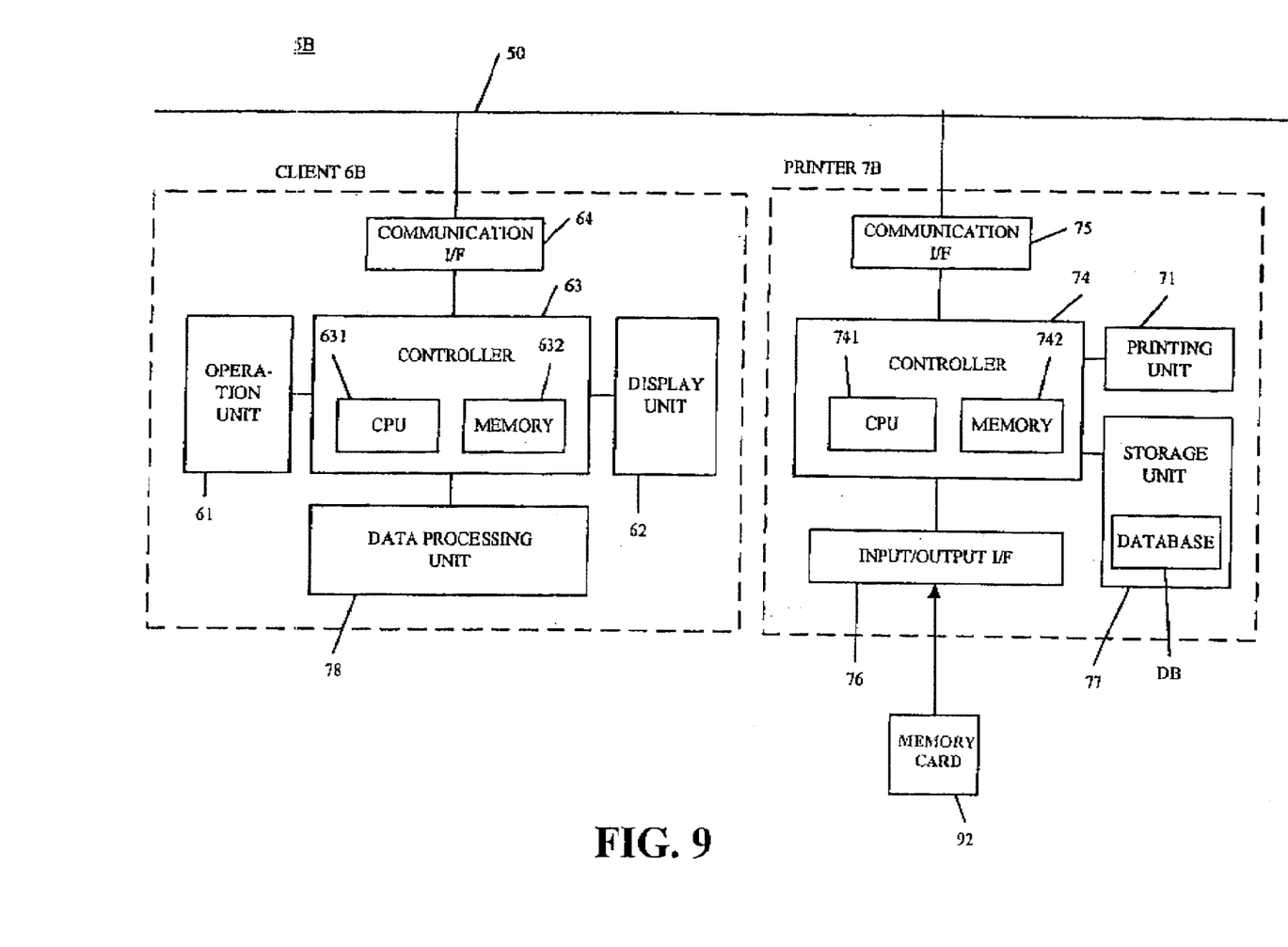
FIG. 9 is a drawing showing the function blocks of a printing system 5B.

While the printing system 5A described above has a construction in which the data processing unit 78 is included in the printer 7A, a printing system 5B having a construction in which the data processing unit 78 is included in the client, as shown in FIG. 9, is also acceptable.

The operations of tie printer 7B of this printing system 5B are the same as the operations of the printer 7A described above, except that the operation of step S14 in the flow chart shown in FIG. 8 is executed not by the printer 7B, but by the client 2B.

Printing can be performed using the printing parameters desired by the recipient via the construction of the printing system 5B in the same manner as with the printing system 5A.

Embodiment

A printing system 1C (see FIG. 2), which is an embodiment of the present invention, has the same construction as the printing system 1A except that the contents of the database DB in the storage unit 35 of the print server 3A are different.

While one set of printing parameters is associated with each output apparatus user in the database shown in FIG. 3, in the database DB of this embodiment, document quality information is added to the information that specifies the output apparatus user, such that different printing parameters can be used for the same output apparatus user by specifying the document quality corresponding to the type of the printed material.

Figure 10:
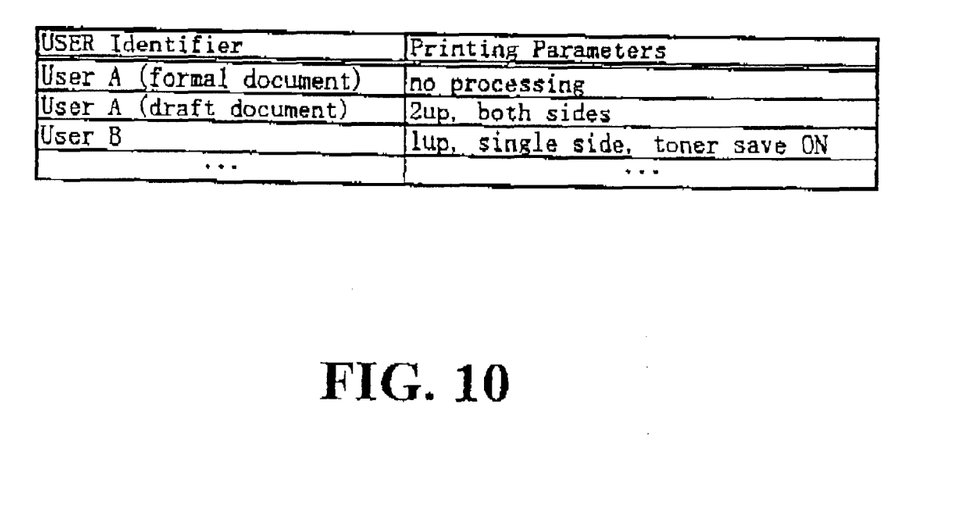
FIG. 10 is a drawing showing one example of the data stored in the database DB pertaining to an embodiment of the present invention.

Specifically, as shown in FIG. 10, 'no processing' and '2up, both sides' are set as printing parameters associated with 'user A (formal document)' and 'user A (draft)', respectively, for example. As a result, for the same user A, a situation in which printing is performed using the formal document style are distinguished from a situation in which printing is performed using the draft style.

The operation of the print server 3A of the printing system 1C are identical to the operations shown in the flow chart of FIG. 4. In these operations, however, combined information comprising output apparatus user (specified recipient) information and document quality (specified document type) information is specified, and the printing parameters associated with this combined information are extracted from the database DB shown in FIG. 10 and specified as the printing parameters to be used.

Through the operations of the printing system 1C described above, printing can be performed using the printing parameters desired by the output apparatus user. Furthermore, because document quality information is specified in addition to the output apparatus user, more precise printing parameter can be performed.

Figure 11:
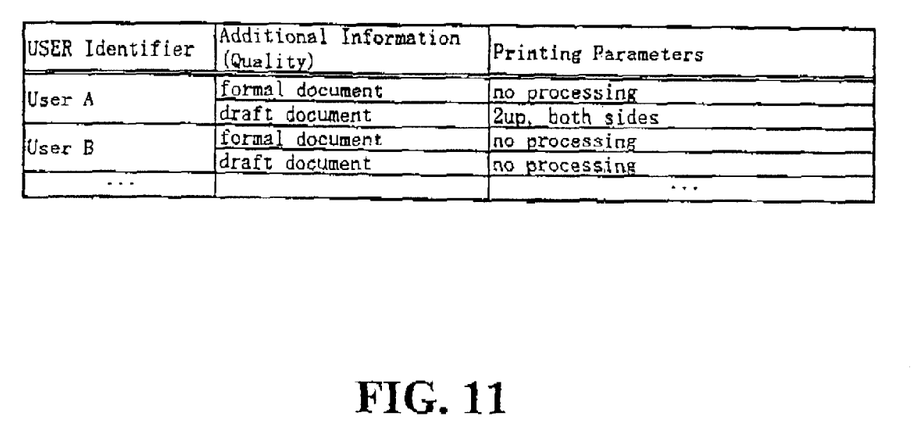
FIG. 11 is a drawing showing one example of the data stored in the database DB.

The database DB of the printing system 1C described above has a construction in which document quality information is added to the user name information as part of the user identifier, but it is also acceptable if, as shown in FIG. 11, the document quality information is included as an additional information item separate from the user identifier.

Because the document quality that corresponds to the type of the printed material can be specified in addition to the output apparatus user, as in the case of the printing system 10 described above, more precise printing parameter can be performed.

In addition, output by the printer 4A is carried out based solely on the printing parameters taken from the database DB that were input by the output apparatus user, but printing may be performed while the printing parameters taken from the database DB and the printing parameters input via the client 2A are switched depending on the document quality.

For example, if the document quality indicates 'formal document', the printing parameters input via the client 2A are given priority, while if the document quality indicates 'draft', the printing parameters taken from the database DB and input by the output apparatus user are given priority.

Consequently, because the parameters can be switched, depending on the document quality, between those specified by the output apparatus user and those specified by the client, there is increased freedom in specifying the printing parameters.

Modifications

The specified document type information may be information other than the information that indicates 'formal document' or 'draft'. For example, information that indicates whether the print data comprises 'cover page' data or 'main text' data is also useful as the specified document type information.

The database DB used in this embodiment can be applied in the printing system 5A.

It is not essential that these databases DB be included in the print server or the printer. They may be included in the client or in a different apparatus that is data-communicably connected to the network.

It is not essential that the print data transmission apparatus comprise a personal computer, and may comprise any other apparatus that has a function to send print data, such as an MFP.

As described above, according to these embodiments, printing parameter information associated with a specified recipient is extracted from the database, and printing base data is processed based on the extracted printing parameter information in order Lo generate printing output data. As a result, printing can be performed using the printing parameters desired by the recipient.

Furthermore, because printing parameter information associated with the information regarding the type of the printed material and the recipient is extracted, more precise printing parameter can be carried out.

Although the present invention has been fully described by way of examples with reference to the accompanying drawings, it is to be noted that various changes and modifications will be apparent to those skilled in the art. Therefore, unless such changes and modification depart from me scope of the present invention, they should be construed as being included therein.

What is claimed is:

1. A computer program product comprising:
   a computer-readable medium; and
   computer program contained on said computer-readable medium for performing the steps of:
   detecting a database in which printed material recipient and document type information are associated with printing parameter information;
   obtaining the information regarding the recipient specified by a sender who sends the printing base data;
   obtaining the information regarding the document type specified by the sender as a document type of a printed material;
   extracting from the database the printing parameter information associated with the specified recipient and the specified document type information; and
   instructing a process that processes the printing base data and generates printing output data based on the extracted printing parameter information.

2. A computer program product according to claim 1, wherein the document type information indicates 'formal document or draft'.

3. A computer program product according to claim 1, wherein the document type information indicates whether the print data comprises 'cover page' data or 'main text' data.

4. information processing apparatus in a printing system which information processing apparatuses including transmission apparatus that sends printing base data and an output apparatus that prints out a document based on a print output data are interconnected in a manner that enables mutual data transmission, said information processing apparatus comprising:
   a storage unit that stores a database in which printed material recipient and document type information are associated with printing parameter information;
   first obtaining means that obtains information regarding the specified recipient;
   second obtaining means that obtains information regarding the specified document type;
   extraction means that extracts from the database the printing parameter information associated with the recipient information obtained by the first obtaining means and the document type information obtained by the second obtaining means; and
   a processor that processes the printing base data and generates printing output data based on the printing parameter information extracted by the extraction means.

5. An information processing apparatus according to claim 4, wherein the document type information indicates 'formal document' or 'draft'.

6. An information processing apparatus according to claim 4, wherein the document type information indicates whether the print data comprises 'cover page' data or 'main text' data.

7. An information processing apparatus according to claim 4, further comprising:
   sending means for sending to the transmission apparatus the recipient user information stored in the database.

8. An information processing apparatus according to claim 4, further comprising:
   sending means for sending to the transmission apparatus the recipient user information stored in the database.

9. A print server that generates printing output data by processing printing base data received from the client over a network and sends the generated printing output data to the printer over the network, said print server comprising;
   a storage unit that stores a database in which printed material recipient and document type information are associated with printing parameter information;

first obtaining means that obtains from the client information regarding the specified recipient;

second obtaining means that obtains from the client information regarding the specified document type;

extraction means that extracts from the database the printing parameter information associated with the recipient information obtained by the first obtaining means and the document type information obtained by the second obtaining means; and a processor that processes the printing base data and generates printing output data based on the printing parameter information extracted by the extraction means.

10. A print server according to claim 9, wherein the document type information indicates 'formal document' or 'draft'.

11. A print server according to claim 9, wherein the document type information indicates whether the print data comprises 'cover page' data or 'main text' data.

* * * * *